United States Patent
Bhogal et al.

(10) Patent No.: US 12,501,518 B2
(45) Date of Patent: *Dec. 16, 2025

(54) SYSTEM AND METHOD FOR INDIVIDUAL HEATING ELEMENT CONTROL

(71) Applicant: June Life, LLC, San Francisco, CA (US)

(72) Inventors: Nikhil Bhogal, San Francisco, CA (US); Ryan Perry, San Francisco, CA (US); Matthew Van Horn, San Francisco, CA (US); Nash Witkin, San Francisco, CA (US); Gabriel Risk, San Francisco, CA (US)

(73) Assignee: June Life, LLC, Palatine, IL (US)

( * ) Notice: Subject to any disclaimer, the term of this patent is extended or adjusted under 35 U.S.C. 154(b) by 105 days.

This patent is subject to a terminal disclaimer.

(21) Appl. No.: 18/022,679

(22) PCT Filed: Sep. 8, 2021

(86) PCT No.: PCT/US2021/049466
§ 371 (c)(1),
(2) Date: Feb. 22, 2023

(87) PCT Pub. No.: WO2022/055999
PCT Pub. Date: Mar. 17, 2022

(65) Prior Publication Data
US 2023/0314003 A1     Oct. 5, 2023

Related U.S. Application Data

(60) Provisional application No. 63/075,563, filed on Sep. 8, 2020, provisional application No. 63/115,794, filed on Nov. 19, 2020.

(51) Int. Cl.
*H05B 1/02*     (2006.01)
*A23L 5/10*     (2016.01)
(Continued)

(52) U.S. Cl.
CPC ............. *H05B 1/0263* (2013.01); *A23L 5/15* (2016.08); *A47J 36/32* (2013.01); *A47J 37/06* (2013.01);
(Continued)

(58) Field of Classification Search
CPC .. H05B 1/0263; H05B 2203/005; A47J 36/32; A47J 37/06; A23L 5/15
See application file for complete search history.

(56) References Cited

U.S. PATENT DOCUMENTS 7,750,271 B2    7/2010    Smith et al.
9,089,005 B2    7/2015    Boedicker et al.
(Continued)

FOREIGN PATENT DOCUMENTS

EP    2389044 B1    7/2015
EP    3264900 A1    1/2018
EP    2993410 B1    2/2019

OTHER PUBLICATIONS

"Anova Precision Oven User Guide", https://drive.google.com/file/d/1iCKilP5K6-SluaMRhrtoUA4JFG1IOW5n/view.
(Continued)

*Primary Examiner* — Thien S Tran
(74) *Attorney, Agent, or Firm* — Banner & Witcoff, Ltd.

(57) ABSTRACT

In variants, a method for individual heating element control can include: identifying food within a cook cavity of the cooking appliance, determining a set of cooking instructions associated with the food, the cooking instructions including a different model for each heating element subset, dynamically determining control instructions for each heating element subset based on the respective model, and controlling each heating element subset based on the respective control instructions.

22 Claims, 11 Drawing Sheets

(51) Int. Cl.
*A47J 36/32* (2006.01)
*A47J 37/06* (2006.01)
*F24C 7/08* (2006.01)

(52) U.S. Cl.
CPC ........ *F24C 7/085* (2013.01); *H05B 2203/005* (2013.01)

(56) References Cited

U.S. PATENT DOCUMENTS

| | | |
|---|---|---|
| 10,260,755 B2 | 4/2019 | Bach |
| 2003/0218002 A1 | 11/2003 | Fulton |
| 2010/0006558 A1 | 1/2010 | Mcloughlin et al. |
| 2013/0213951 A1* | 8/2013 | Boedicker ............ H05B 1/0263 219/413 |
| 2018/0292092 A1 | 10/2018 | Bhogal |
| 2019/0053332 A1* | 2/2019 | Cheng .................... F24C 7/046 |
| 2019/0141798 A1* | 5/2019 | Cheng ................. H05B 6/6435 |
| 2020/0201414 A1* | 6/2020 | Knappenberger .. A47J 37/0629 |

OTHER PUBLICATIONS

Perlow, Jason, "Anova Culinary Precision Oven review: A first-generation product for food geeks", Tech Broiler, Apr. 7, 2021.
Sep. 16, 2024—(EP) Extended European Search Report—App 21867514.8.

* cited by examiner

| heating element identifier | phase shift time | period | amplitude (%max power) | amplitude offset | deadtime | heat/cool curve |
|---|---|---|---|---|---|---|
| HE1 | 0 ds | 10 ds | 20% | 40% | 60 ds | f( )=sin(...) |
| HE2 | 10 ds | 10 ds | 40% | 60% | 60 ds | f( )=square(...) |
| HE3 | 20 ds | 20 ds | 60% | 80% | 80 ds | f( )=sawtooth(...) |
| HE4 | 30 ds | 15 ds | 80% | 100% | 60 ds | f( )=constant(...) |
| HE5 | 40 ds | 10 ds | 20% | 40% | 60 ds | f( )=f_custom(...) |
| HE6 | 50 ds | 40 ds | 40% | 60% | 40 ds | f( )=$sin_2$(...) |

SYSTEM AND METHOD FOR INDIVIDUAL HEATING ELEMENT CONTROL

CROSS-REFERENCE TO RELATED APPLICATIONS

This application claims the benefit of U.S. Provisional Application Ser. No. 63/075,563 filed on 8 Sep. 2020 and U.S. Provisional Application Ser. No. 63/115,794 filed on 19 Nov. 2020, each of which is incorporated in its entirety by this reference.

TECHNICAL FIELD

This invention relates generally to the appliance field, and more specifically to a new and useful individual heating element control system and method in the appliance field.

DETAILED DESCRIPTION

The following description of the embodiments of the invention is not intended to limit the invention to these embodiments, but rather to enable any person skilled in the art to make and use this invention.

1. Overview

Figure 1:
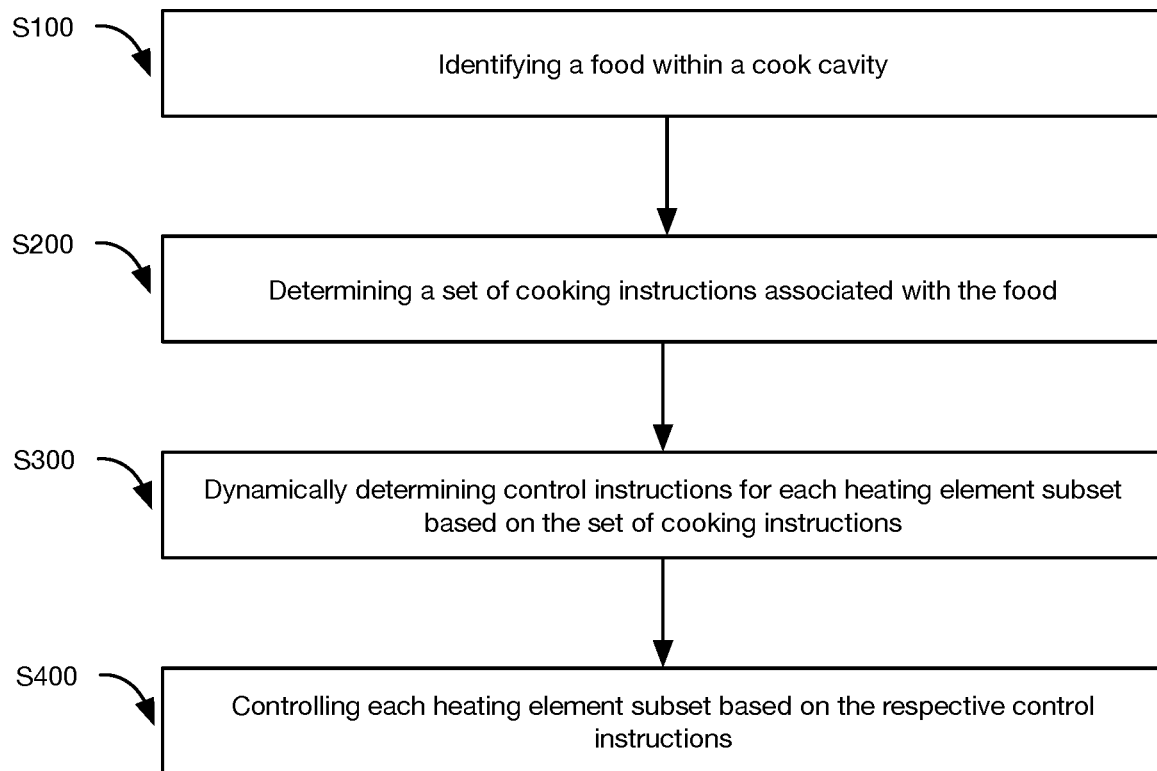
FIG. 1 is a schematic representation of the method.

As shown in FIG. 1, the method for individual heating element control can include: identifying a food within a cook cavity S100, determining a set of cooking instructions associated with the food S200, determining control instructions for each heating element subset based on the set of cooking instructions S300, controlling each heating element subset based on the respective control instructions S400, and/or any other suitable elements.

Figure 2:
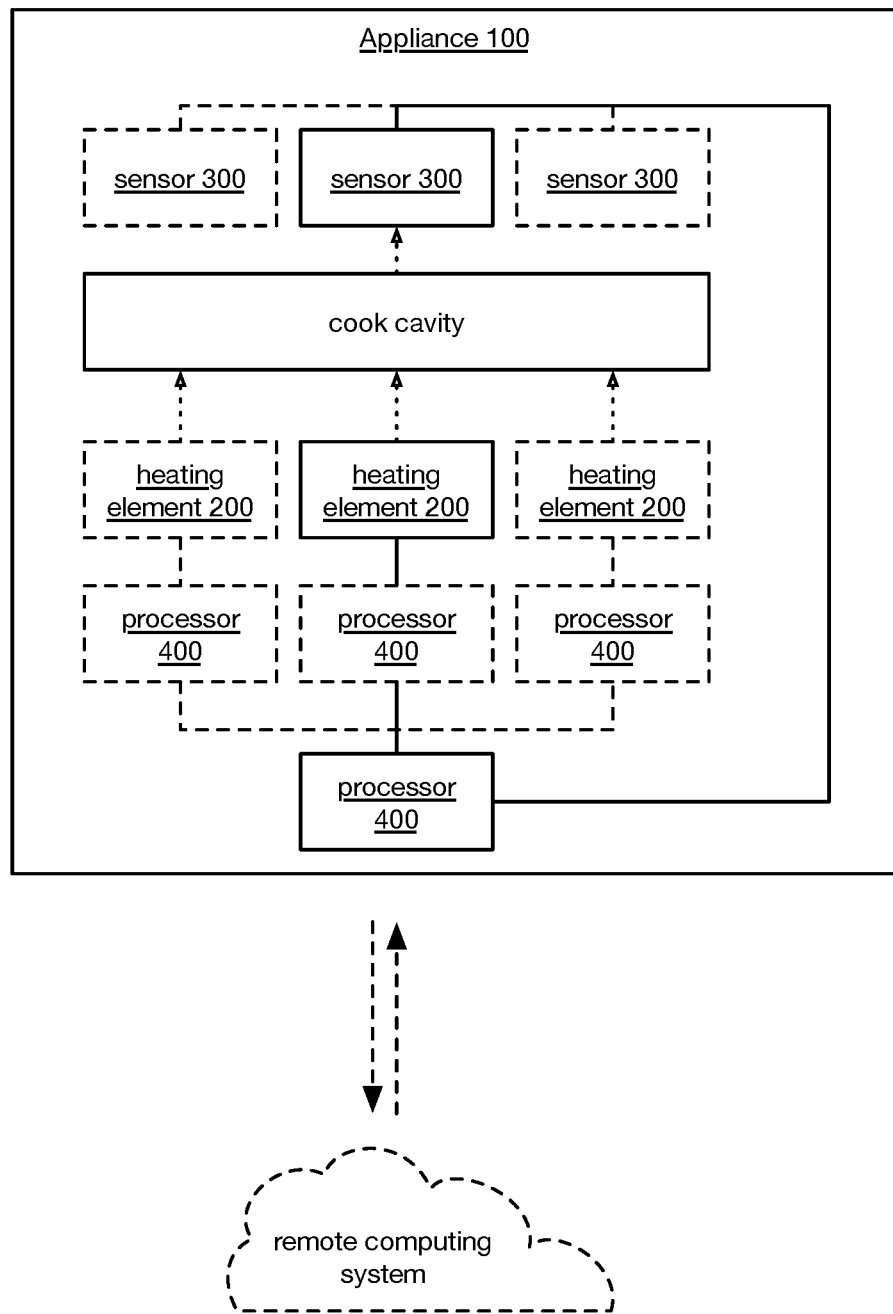
FIG. 2 is a schematic representation of the system.

As shown in FIG. 2, the system for individual heating element control can include an appliance 100, one or more heating elements 200, one or more sensors 300, one or more processing systems 400, and/or any other suitable components.

One or more variations of the system and/or method can omit one or more of the above elements and/or include a plurality of one or more of the above elements in any suitable order or arrangement.

2. Examples

In an example, the method can include: identifying food within a cook cavity of the cooking appliance, wherein the cooking appliance has a set of heating elements; determining a set of cooking instructions associated with the food, wherein the set of cooking instructions includes temperature setpoint and a different model for each heating element subset of the set of heating elements; determining control instructions for each heating element subset based on the respective model and the temperature setpoint; and controlling each heating element subset based on the respective control instructions. In variants, determining the control instructions for each heating element subset can include, for each timestep: determining an overall target output for the cavity (e.g., based on a measured temperature and temperature setpoint, based on the cooking instructions for the timestep, etc.); calculating an output ratio for each heating element subset based on the respective model; determining a target output for each heating element subset based on the output ratio and the overall target output; and optionally scheduling the heating element subsets to AC cycles within the timestep based on the target output for the respective heating element subset. The method can optionally include validating the control instructions for the timestep, wherein the control instructions are used when valid, and control instructions for a prior timestep are used when the control instructions are invalid. In variants, the method can also include an inner control loop that determines the overall target output based on the measured temperature (e.g., cavity temperature) and target temperature, and can optionally adjust the control instructions based on the difference between the measured and target temperatures.

3. Benefits

The method can confer several benefits over conventional heating element control methods.

First, variants of the method can individually control heating elements according to a model (e.g., appliance user, product developer, etc.). This confers finer-grained temporal control over individual heating element subset operation, which can create temporally- and spatially-variant heating patterns within the cook cavity. For example, this can achieve rotisserie functionality for larger proteins (e.g., whole chicken, whole fish, prime rib, beef roasts, pork roasts, lamb roasts etc.) using static heating elements. In another example, this can achieve substantially static heat distribution throughout the cavity for static food (e.g., no rotation of food).

Second, variants of the method enable appliance developers to programmatically define heating element behavior through the model. For example, each model can determine a target power output (and/or scaling factor) for the respective heating element subset for each individual timestep. This can free developers from manually specifying each heating element's target output for each timestep.

Third, variants of the method can enable the heating elements to be dynamically responsive to the current cook cavity state, instead of operating at a fixed power output. For example, a first control loop can determine an overall target power output for the cook cavity (e.g., based on the difference between a measured cavity temperature and a target cavity temperature), and a second control loop can determine each heating element's power output as a proportion of the overall power output. This can dynamically adjust each heating element's power output responsive to the cook cavity's current power needs.

Fourth, variants of the method can include food-agnostic, spatiotemporal control models, which can free developers from having to develop control models for each food class.

For example, each model can define a timeseries of power output ratios, such that the set of models (e.g., for all heating element subsets in the appliance) cooperatively a spatiotemporal pattern. In this example, since the power output ratios are used to scale an overall target power output, and the overall target power output can be dictated by the food class, the models can be food class agnostic. This can allow the same model set to be used for different food classes. For example, a rotisserie model set developed for chicken can be used for a pork roast, or a slow roast model set developed for prime rib can be used for a rack of lamb. This can also confer additional optionality for each food class. For example, a whole chicken can be cooked with substantially static heat distribution throughout the cavity, or be cooked using a rotisserie model set.

Fifth, the method can validate the control instructions, which can determine whether the aggregate power output is valid or invalid by comparing the aggregate power output to a threshold power output. This can protect electrical circuits by preventing overloads and blown fuses.

However, the method and system can confer any other suitable benefits.

4. System

The method is preferably performed using a system including one or more appliances 100. Each appliance 100 can include one or more: heating elements 200, sensors 300, processing systems 400, and/or any other suitable components. However, the method can be performed with any other suitable system.

Figure 7:
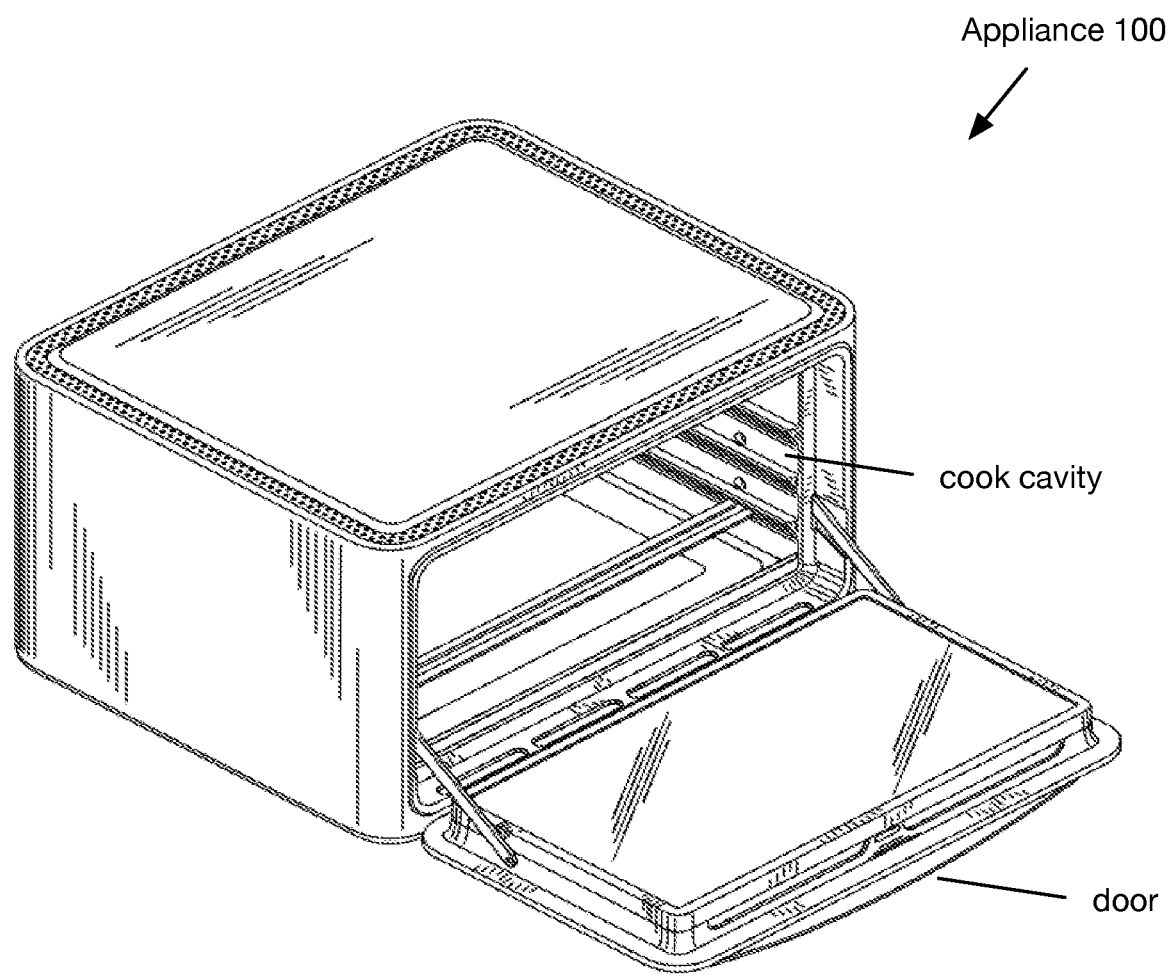
FIGS. 7-8 depict variants of the system.
Figure 8:
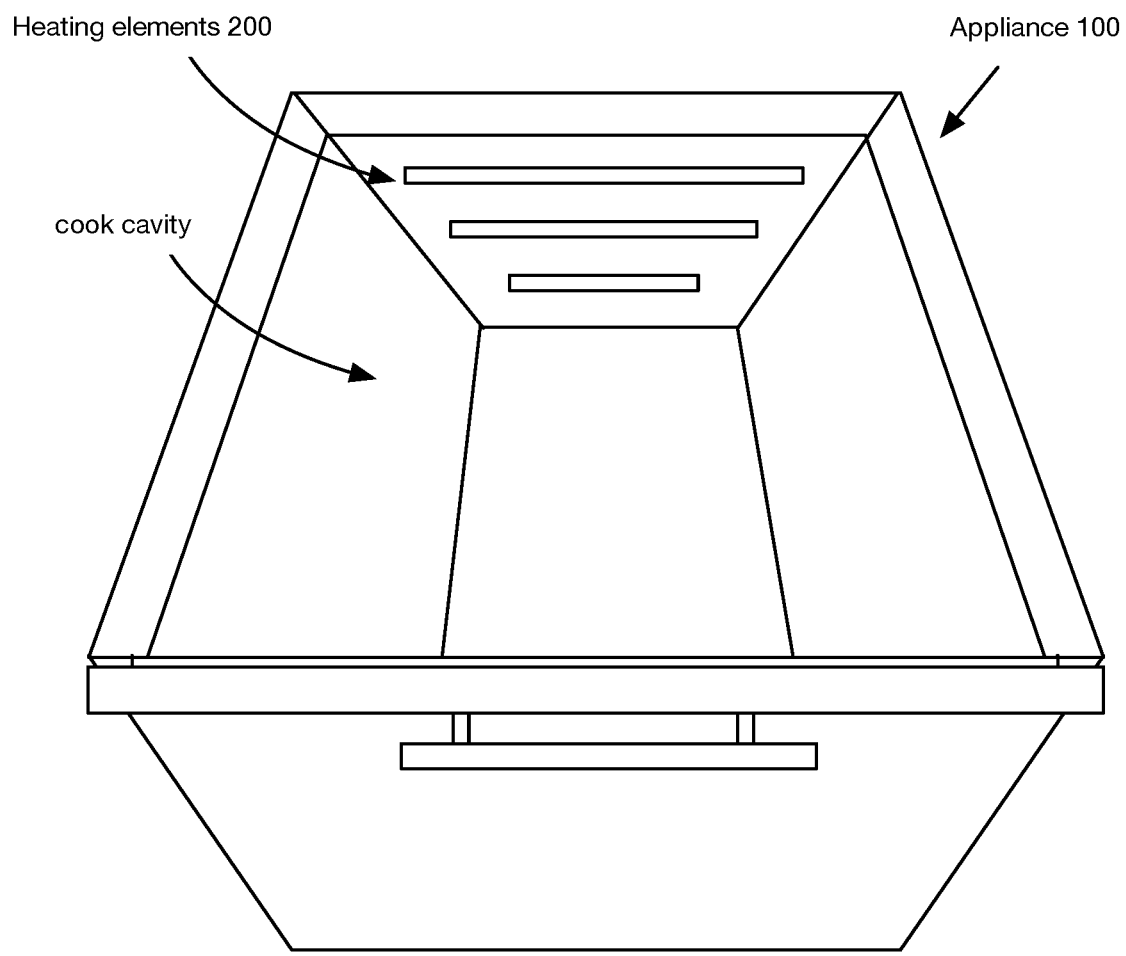

The appliance 100 can function to perform one or more processes of the method. The appliance can include: a housing, which can define a cook cavity; one or more racks or support surfaces located within the cook cavity; and one or more heating elements located within or relative to the cook cavity (e.g., left, right, bottom, top, back, etc.). The appliance can optionally include a sealing component (e.g., a lid, a door, etc.) one or more communication systems (e.g., APIs, WiFi system, cellular system, Bluetooth system, etc.); and/or any other suitable components. The appliance can be a commercial oven, an industrial oven, a conventional oven, a convection oven, a grill (e.g., charcoal grill, electric grill, a gas grill (e.g., using propane or other flammable fuel), a smoker, a pizza oven, an appliance operable above a temperature threshold (e.g., 500° F., 450° F., etc.), and/or any other suitable appliance. Examples of the appliance are depicted in FIGS. 7-8. Specific example of appliances that can be used include those described in U.S. application Ser. No. 16/380,894 filed 10 Apr. 2019, U.S. application Ser. No. 17/014,932 filed 8 Sep. 2020, U.S. application Ser. No. 17/376,535 filed 15 Jul. 2021, and/or U.S. application Ser. No. 17/403,472 filed 16 Aug. 2021, each of which is incorporated herein in its entirety by this reference. However, the appliance can be otherwise configured.

The appliance can define a cavity (e.g., cooking chamber, cooking volume, cook cavity, etc.) that can receive food, accessories (e.g., plate, pan, baking sheet, pot, etc.), and/or other items. The cavity can include one or more racks for positioning the food and/or accessories in the cavity. The cavity can be accessible using the appliance door (e.g., side door, top door, etc.) or otherwise accessed. The cavity can be open, closed (e.g., reversibly sealed by the sealing component), partially open, or otherwise configured. The cavity can be lit, unlit, or have other visual properties. The cavity can include or be associated with one or more fiducials, which can be used to determine a sensor pose relative to the cavity. The fiducials are preferably statically mounted relative to the cavity (e.g., with a known pose, position, and/or orientation), but can alternatively be movably mounted to the cavity. The fiducials can include: visual fiducials (e.g., asymmetric icons, stickers, stamps, bezels, or other features, etc.), wireless fiducials (e.g., Bluetooth beacons asymmetrically mounted to the cavity or housing, wherein the sensor pose can be determined via triangulation or trilateration), and/or other fiducials.

Examples of accessories that can be used include: trays, pots, pans, stones, steels, peels, and/or other cooking accessories. The accessory can define one or more cavity occupancy regions (e.g., a baking sheet with predetermined sections (e.g., predefined occupancy regions), not define occupancy regions, include one or more fiducials (e.g., visual, wireless, etc.), and/or include other orientation or classification features.

The appliance can include memory (e.g., non-volatile, volatile, etc.) that can store one or more states. The appliance can include a processor for sampling and recording cavity measurements, a communication system for receiving and/or transmitting information (e.g., to and/or from a remote computing system, to and/or from a user device, etc.), and/or any other suitable elements. Examples of appliances include: ovens, toasters, slow cookers, air fryers, warming drawers, broilers, cooktops, grills, smokers, dehydrators, and/or any other suitable appliance. However, the appliance can additionally or alternatively include any other suitable components.

The appliance can include one or more user interfaces that function to receive and/or present information to a user. Examples of user interfaces that can be used include a touchscreen interface, button of the appliance, dial/knob of the appliance, connected mobile device, and/or other interfaces. The user interface can be mounted to the appliance (e.g., button of the appliance, dial/knob of the appliance, touchscreen interface of the appliance, etc.) or not mounted to the appliance (e.g., mobile device, etc.). The user input and/or user selection can be voice-based (e.g., uttering a phrase), tactile-based (e.g., pressing a physical or digital button, toggling a control), motion-based (e.g., waving hand in front of the appliance), and/or any other suitable user input and/or user selection.

Figure 5A:
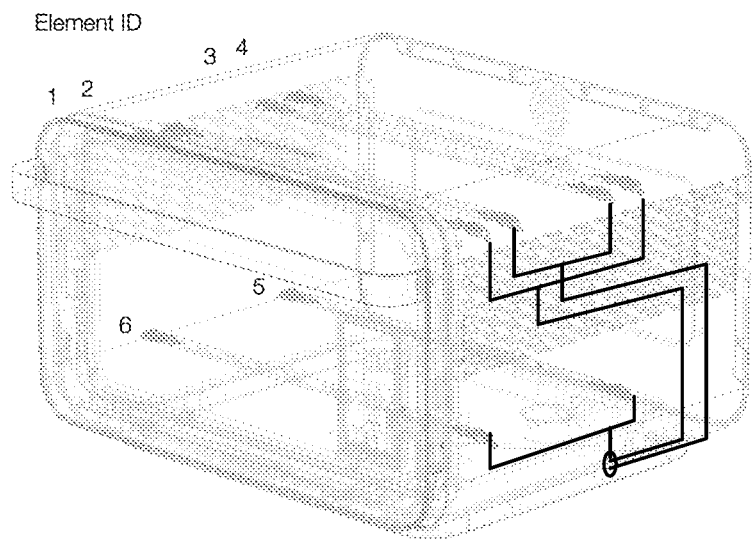
FIG. 5A depicts an example of the system with 6 heating elements split into 3 heating element subsets.
Figure 5B:
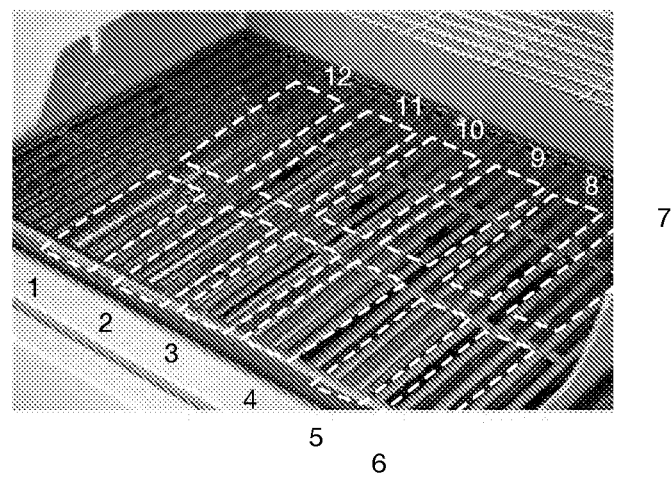
FIG. 5B depicts an example of the system with 12 heating element subsets.

The one or more heating elements can function to cook the food in the cook cavity. The one or more heating elements (e.g., 1, 2, 2-10, 3-7, 6, 7, 8, 9, 10-20, more than 20 heating elements, etc.) can be evenly or unevenly distributed along a cavity surface. The heating elements can be positioned on the top of the appliance cavity, the bottom, the sides, the back, and/or otherwise positioned along a cavity surface. The heating elements can be static (e.g., mounted to the appliance cavity wall) or mobile. The heating elements can direct heat from the top-down, bottom-up, at an angle relative to a gravity vector (e.g., less than 45 degrees, more than 45 degrees, less than 90 degrees, more than 90 degrees, between 30-50 degrees, between 20-170 degrees, etc.), and/or otherwise positioned. The heating elements can be arranged front-to-back, left to right, edge-to-edge, in a grid, array, and/or in any other arrangement. The heating elements addressable and/or controllable: individually, in subsets or particular combinations (e.g., pairs, trios, etc.; such as adjacent pairs, top-bottom pairs; front-middle-back pairs, etc.), or not individually addressable and/or controllable. The heating elements can be addressable and/or controllable as a set and/or subset of heating elements (e.g., {heating element 1}, {heating element 1, heating element 2, . . . , heating element N}, {heating element 1, 3, 5}, etc.). Subsets of heating elements can intersect (e.g., {heating element 1, heating element 2}∩{heating element 1, heating element 3}={heating element 1}) or not intersect (e.g., {heating element 1, heating element 2}∩{heating element 3, heating element 4}={ }). In other words, different heating element subsets can include overlapping heating elements, or include distinct heating elements. The heating elements can be individually wired or in particular combinations (e.g., pairs, trios, etc.; such as adjacent pairs, top-bottom pairs, etc.); example shown in FIG. 5.

The heating elements can have adjustable power output (e.g., range from 0-100%, 0-10 associated with the minimum and maximum power, etc.), binary power output, and/or any other suitable power output.

The heating elements can be metal, ceramic, carbon fiber, composite (e.g., tubular sheathed heating element, screen-printed metal-ceramic tracks, etc.), or otherwise constructed. The heating elements can be standard burner tubes, infrared burner tubes, and/or any other suitable heating element. The heating elements can transfer heat using conduction, convection, infrared radiation, and/or any other heat transfer technique. The heating elements can apply heat using flames, gas, electric, infrared, and/or any other suitable heating method. The heating elements can each heat a predefined heating zone (e.g., heating area, heating volume, etc.) (e.g., with directed heat, with more than a threshold proportion of the emitted heat, etc.), heat the entire cavity (e.g., with ambient or indirect heat), or otherwise heat the cavity. The heating elements preferably have a heating rate of at least 25° F./s, but can additionally or alternatively have higher heating rates (e.g., 30° F./s, 50° F./s, etc.) or lower heating rates (e.g., between 0° F./s and 25° F./s, less than 5° F./s, less than 10° F./s, less than 20° F./s, etc.). The heating elements preferably have a cooling rate of at least 10° F./s (e.g., after the heating element is turned off), but can additionally or alternatively have higher cooling rates (e.g., higher than 15° F./s, 20° F./s), or lower cooling rates (e.g., lower than 10° F./s, lower than 5° F./s, lower than 1° F./s, etc.).

In a first specific example, the one or more heating elements can include multiple carbon fiber heating elements. The power output of each carbon fiber heating element can be: between 300 W-600 W, between 440 W-460 W, more than 600 W, less than 300 W (e.g., 400 W, 430 W, 450 W, 460 W, 480 W, 500 W, etc.), and/or any other suitable power output. The maximum temperature of the multiple carbon fiber heating elements can be above, below, or equal to: 300° F., 500° F., 700° F., and/or any other suitable temperature.

In a second specific example, the one or more heating elements can include multiple light source heating elements. More specifically, the light source heating elements can emit infrared light to cook the food.

The heating elements are preferably controlled at a predetermined frequency (e.g., with a different control instruction for each cycle), but can alternatively be controlled on a time window basis or otherwise controlled. The predetermined frequency is preferably constant, but can alternatively be variable. The predetermined frequency can be (or be determined based on): a power supply frequency or utility frequency (e.g., alternating current frequency, such as 25 Hz, 40 Hz, 50 Hz, 60 Hz, etc.), a processor frequency (e.g., processor clock speed), a valve switching frequency (e.g., gas valve switching frequency), and/or otherwise determined. Control instructions for the heating elements can be determined for each cycle, for a timestep (e.g., encompassing multiple cycles, such as 10 cycles, 50 cycles, 100 cycles, 200 cycles, 300 cycles, etc.), for a predetermined time duration (e.g., 1 second, 10 seconds, 1 minute, minimum temporal unit for the food class, etc.), and/or for any other suitable time window. In a specific example, the control instructions can include a heating element power output (e.g., on/off; percentage power output, etc.) for each utility cycle within a timestep, wherein the timestep can be a processor cycle and/or otherwise defined. In a second specific example, the control instructions can include a heating element power output (e.g., valve position) for each valve switching cycle within each time window. However, the control instructions can be otherwise defined. The heating elements can be controlled using pulse width modulation (PWM), pulse density modulation (PDM), binary code modulation (BCM), delta-sigma modulation, and/or any other suitable control method.

However, the one or more heating elements can include any other suitable components.

The system can include one or more sensors for determining cavity measurements. For example, the sensors can sample measurements of food within the cavity. In another example, the sensors can sample cavity temperature measurements (e.g., directly; by correcting a sampled wall temperature with a correction factor to determine a cavity center temperature, etc.). The sensors are preferably integrated into the appliance, but can additionally or alternatively be separate from the appliance. The one or more sensors can include one or more: camera sensors, motion sensors, IMU sensors, depth sensors (e.g., projected light, time of flight, radar, etc.), temperature sensors, audio sensors, door open/close sensors, weight sensors, power sensors (e.g., Hall effect sensors), proximity sensors, and/or any other suitable sensor. The sensors can be directly or indirectly coupled to the cavity. The sensors can be connected to and controlled by the processor of the appliance, a user device, or be otherwise controlled. The sensors are preferably individually indexed and individually controlled, but can alternatively be controlled together with other like sensors. The sensors can be mounted to the cavity walls, to a probe, to a cavity center, and/or to any other suitable surface.

In a first example, the set of sensors can include temperature sensors that can be mounted to the cavity wall and wired electrically to the processor of the appliance.

In a second example, the set of sensors can include temperature sensors that can be probe thermometers, the probe thermometers can be wirelessly connected via Bluetooth, Wi-Fi, or other data connection to the processor of the appliance.

However, any other suitable set of sensors can be used.

The one or more camera sensors can include CCD cameras, CMOS cameras, wide-angle, infrared cameras, stereo cameras, video cameras, and/or any other suitable camera. The camera sensors can be used with one or more lights (e.g., LEDs, filament lamps, discharge lamps, fluorescent lamps, etc.), which can be positioned next to the cameras, within a predetermined distance from the camera system, and/or otherwise positioned relative to the camera system. The camera sensors can be externally or internally located relative to the cook cavity. The camera sensors can be mounted to the cavity wall, wherein the camera lens is preferably flush with the cavity wall, but can alternatively be recessed or protrude from the cavity wall. The camera can be centered along the respective appliance surface, offset from the appliance surface center, or be arranged in any other suitable position. The camera can be statically mounted to the appliance surface, actuatably mounted to the appliance surface (e.g., rotate about a rotational axis, slide along a sliding axis, etc.), or be otherwise coupled to the appliance. However, the sensors can include any other suitable components.

The system can include a processing system that can be local to the appliance and/or remote from the appliance. The processing system can be distributed and/or not distributed. The processing system can include one or more microcontrollers, CPUs, GPUs, IPUs, and/or any other suitable processing system. The processing system can be configured to execute the method (or a subset thereof); different processors can execute one or more modules (e.g., one or more algorithms, search techniques, etc.); and/or be otherwise configured. The processing system can include one or more non-volatile computing elements (e.g., processors, memory, etc.), one or more non-volatile computing elements, and/or any other suitable computing elements. However, the processing system can be otherwise configured.

Figure 9:
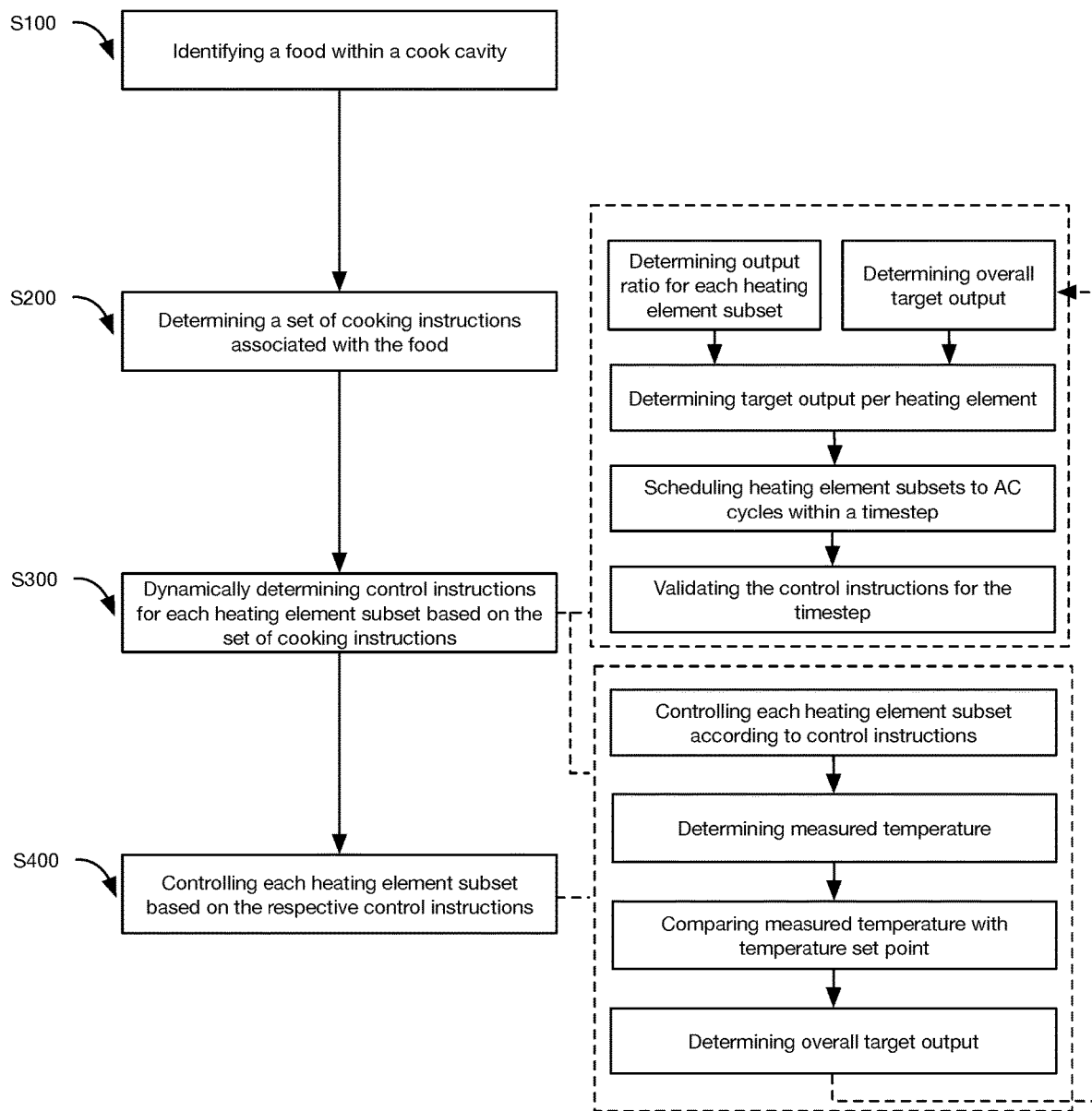
FIG. 9 is a schematic representation of an example of appliance control.

In a first variant, the processing system can include a main logic board (e.g., primary microcontroller, master microcontroller, 32 bit microcontroller to execute logical and/or arithmetic functions, etc.) connected to a plurality of dumber microcontrollers (e.g., secondary microcontrollers, slaves microcontrollers, 8 bit microcontrollers to execute logic and/or arithmetic operations, etc.). The main logic board connected to the plurality of secondary microcontrollers can control a cascade control system with an inner loop and an outer loop (example shown in FIG. 9). For example, the main logic board can control the inner loop of the cascade control system, which can determine a temperature setpoint for the center of the cook cavity, receive the temperature for the center of the cook cavity from sensors, execute a function generator to determine heating element ratios for heating elements, set/send commands to dumber microcontrollers, control sensors, and assign on/off to heating elements for each AC cycle. The secondary microcontrollers can control the outer loop of the cascade control system, which can control heating elements and assign on/off to heating elements for an AC cycle. Alternatively, the roles can be switched between the main and secondary logic boards.

However, any other suitable processing system can be used.

The processing system can include one or more modules, which can include one or more: classification modules, object detector modules, segmentation modules, and/or any other suitable module.

The classification module can include one or more classifiers, which can function to determine one or more classes, such as a cavity occupancy region, food type, count, and/or any other suitable class. The one or more classes can be determined using multiple classifiers, a single classifier, and/or any other suitable number of classifiers. The classifiers can include: neural networks (e.g., CNN, DNN, region proposal networks, single shot multibox detector, YOLO, RefineDet, Retina-Net, deformable convolutional networks, etc.), cascade of neural networks, logistic regression, Naive Bayes, k-nearest neighbors, decision trees, support vector machines, random forests, gradient boosting, and/or any other suitable classifier.

The classifier can be an image classifier, an event classifier (e.g., door open event, weight change event, food insertion event, food removal event, etc.), and/or any other classifier. The classifier can be a multi-class classifier, binary classifier, and/or any other suitable classifier. However, the classification module can additionally or alternatively include any other suitable elements.

The object detection module can include one or more object detectors, which can function to detect foodstuff, detect cooking tools, cooking accessories, fiducials, and/or any other suitable object depicted in an image. The object detector can include: neural networks (e.g., CNN, DNN, region proposal networks, single shot multibox detector, YOLO, RefineDet, Retina-Net, deformable convolutional networks, etc.), Viola-Jones object detection framework based on Haar features, scale-invariant feature transform (SIFT), histogram of oriented gradients (HOG) features, and/or any other suitable object detector.

The segmentation module can include one or more segmentation models, which can function to determine foodstuff segments (e.g., foodstuff masks) for each food depicted in the measurement. The segmentation model can be used with the classifier (e.g., the foodstuff masks can be combined with the image to determine an occupancy region for the particular food instance), the object detector (e.g., to segment an image based on the detected object), and/or used with any other suitable algorithm or not used with other algorithms. The segmentation model can be a semantic segmentation model, an instance-based segmentation model, and/or any other suitable segmentation model. The segmentation model can be k-nearest neighbor clustering algorithms, gradient-based algorithms, and/or any other suitable algorithm. However, the processing system can be otherwise configured.

The system can include a food identification module that functions to identify food and/or food parameters (e.g., cavity location, number, volume, etc.) within the cook cavity.

In a first variation, the food identification module includes a model that determines a food class based on one or more cavity measurements. The model can be one of the classifiers as discussed above, but can alternatively be a clustering model or be otherwise configured. In operation, the food identification module can receive one or more cavity measurements (e.g., from the cavity sensors) and identify the food class (e.g., food identity) based on the measurements. For example, the food identification module can receive one or more images depicting food within the cavity, and classify the food (e.g., as one of a predetermined set of classes) using a trained neural network. In other examples, the food can be identified as discussed in U.S. application Ser. No. 17/014,932 filed 8 Sep. 2020, U.S. application Ser. No. 17/216,036 filed 29 Mar. 2021, U.S. application Ser. No. 17/365,880 filed 1 Jul. 2021, U.S. application Ser. No. 17/376,535 filed 15 Jul. 2021, and/or U.S. application Ser. No. 17/403,472 filed 16 Aug. 2021, each of which is incorporated in its entirety by this reference. However, the food can be otherwise automatically identified.

In a second variation, the food identification module includes a user interface, wherein the user selects a food identity (e.g., food class) within the user interface. However, the food identity can be otherwise determined.

The system can be used with one or more cooking instructions which can include: recipes, cook programs, cook primitives, operation instructions, target parameters (e.g., temperature setpoint, power setpoint, etc.), heating element indexes, model types (e.g., neural networks, regression, periodic waveform equations, etc.), model sets (e.g., model identifiers, model parameter values, etc.), and/or other cooking instruction parameters. The cooking instructions can be specific to an appliance type or class, or globally applicable. The cooking instructions can be specific to a food type or class, a combination of food parameters (e.g., food type, food volume or count, food location within the cook cavity, etc.), be generic, and/or otherwise general or specific. The cooking instructions can be specific to a subset or set of heating elements (e.g., specific heating element identifiers, relative heating element arrangement, number of heating elements, etc.), all heating elements, any heating element, the cook cavity and/or any other suitable component.

In variants, each cooking instruction can include one or more temperature setpoints, or exclude a temperature setpoint. The temperature setpoint is preferably associated with and/or determined based on the food class (e.g., 350° F. for whole chicken), but can additionally or alternatively be determined based on the cooking methodology (e.g., 165° F. for slow roasting chicken), be a default value (e.g., 100%, max temp, etc.), or be otherwise determined. The temperature setpoint is preferably predetermined (e.g., by a recipe author, from regulatory guidelines, etc.), but can alternatively be dynamically determined (e.g., based on a difference between a measured food parameter, such as food color, and a target food parameter). The temperature setpoint can include a single temperature setpoint for the entire cook session, a timeseries of temperature setpoints for the cook session (e.g., a temperature for each timestep, a temperature for each time window, etc.), an equation or model defining how the temperature setpoint should be determined, and/or be otherwise configured. The temperature setpoint can be for a cavity, for an internal temperature of a food, and/or for any other suitable volume.

In variants, each cooking instruction can additionally or alternatively include a power setpoint, which functions to specify the target collective power output from all the heating elements. Alternatively, the power setpoint can be dynamically determined. For example, the power setpoint can be determined based on the difference between a measured cavity temperature and a target cavity temperature (e.g., the temperature setpoint), wherein the heating elements collectively operating at the power setpoint transitions the cavity from the measured temperature to (and/or closer to) the target cavity temperature. The power setpoint can be determined using an equation, a model (e.g., Markov model, neural network, etc.), a lookup table, and/or otherwise determined.

In variants, each cooking instruction can be associated with one or more model sets. The model set can be identified with a model identifier (e.g., "rotisserie," "model 1," etc.) or be unidentified. The model set is preferably associated with a spatiotemporal heating pattern, but can additionally or alternatively be associated with a spatial heating pattern, a temporal heating pattern, and/or other heating pattern. The model set is preferably not specific to a food class (e.g., cooking instructions for food classes can specify a model set, but the model sets are not specific to said food class and can be shared across food classes), but can alternatively be specific to a food class. The models can be: equations (e.g., defining periodic waveforms), neural networks, regressions, and/or any other suitable model. The model set preferably includes a model for each heating element subset, but can alternatively include a single model for all heating element subsets. The model set can additionally or alternatively include a model for each convection element subset (e.g., convection fan subset), steaming subset (e.g., valve and/or reservoir subset), and/or other cooking element subset. Different models for different cooking element types can have the same or different model parameters.

Figure 3:
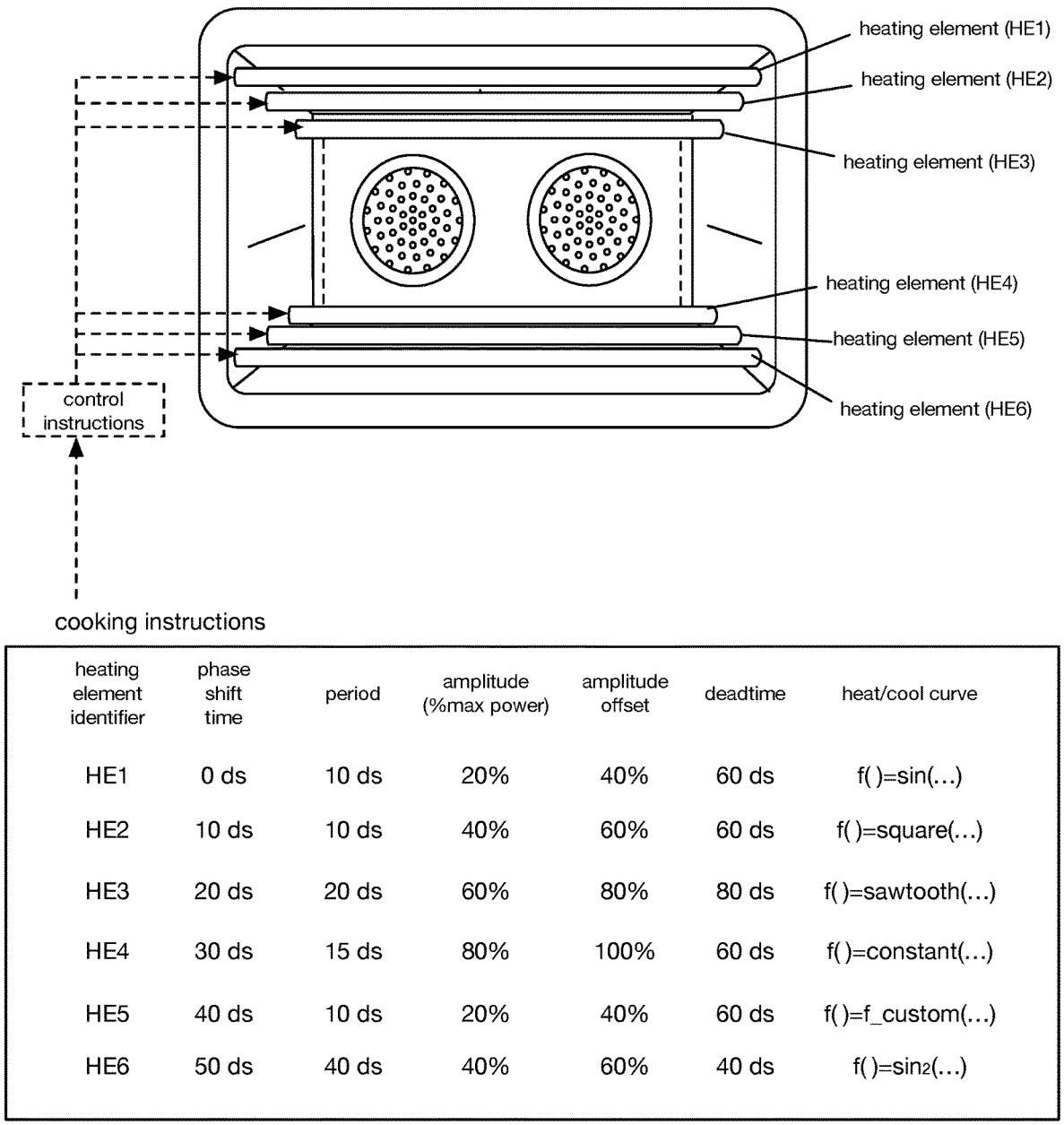
FIG. 3 depicts an example of the method.

Each model preferably defines an operation schedule for the cooking element, but can alternatively define any other suitable parameter. The operation schedule can include a heating schedule, a rotation schedule, and/or any other suitable schedule. Each model is preferably defined by a set of model parameter values. Examples of model parameters within each model can include: a curve type, curve period, curve amplitude, amplitude offset, deadtime, phase shift time, and/or other model parameters (e.g., example shown in FIG. 3). The models can determine: scaling factors (e.g., ratios), target power output, target fan speed, target switching rate, and/or any other suitable operation parameter value. The models are preferably predetermined, but can alternatively be dynamically determined. The models are preferably manually determined, but can alternatively be automatically determined (e.g., learned, calculated from a simulation, calculated from an optimization, randomly determined, etc.). The models can be determined: de novo for each cooking element, from a template model, and/or otherwise determined. In a first example, a correction factor is applied to the template model's values based on the heating element subset's parameters, such as location. In a second example, each model's parameter value is iteratively determined using a search strategy that leverages the template model's values as a seed. In a third example, the model parameter values can be determined by fitting a curve to a pattern (e.g., user-provided pattern; heating pattern from a prior cook session; etc.) or otherwise learned. However, the models can be otherwise determined.

The model can be: an equation (e.g., defining a curve), a neural network, a lookup table, a graph, and/or be any other suitable model. The model is preferably defined as a function of time, but can alternatively be defined as a function of temperature and/or otherwise defined. However, the models can be otherwise configured.

Figure 4:
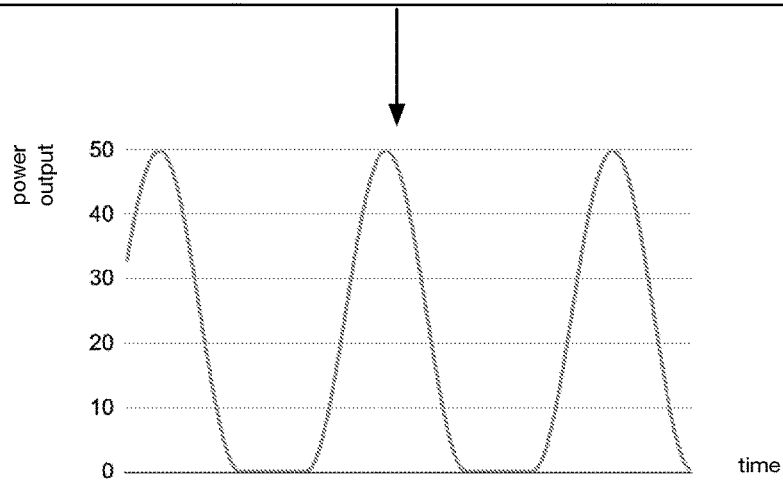
FIG. 4 depicts an example of the method.

In a first example, the cooking instructions can include a temperature setpoint (e.g., 50° F., 70° F., 100° F., 120° F., 140° F., 160° F., any range defined therein, lower than 50° F., higher than 160° F., etc.) and a model identifier, wherein the identified model can include a predetermined set of model parameter values (e.g., sine curve, 50 deci-seconds curve period, 50 percentage curve amplitude, 0 percentage amplitude offset, 20 deci-seconds deadtime, 15 deci-seconds phase shift time, etc.); example shown in FIG. 4.

The system can be used with one or more control instructions which can include: target parameters (e.g., target power output, target pulse width modulation, etc.), a power curve during a time window, power output during a time window, power output across the cook volume (e.g., spatial power distribution) and/or any other suitable control instructions. The control instructions can be specific to an appliance type or class, or globally applicable. The control instructions can be specific to a subset or set of heating elements (e.g., specific heating element identifiers, relative heating element arrangement, number of heating elements, etc.), all heating elements, any heating element, the cook cavity and/or any other suitable component. The control instructions can be for: a timestep (e.g., one processing cycle, 1 s, 10 s, etc.), a cooking phase (e.g., a preheat phase, a slow roasting phase, a broiling phase, etc.), a predetermined time window (e.g., 5 min, 10 min, etc.), the entire cook session (e.g., from food insertion to final food removal), and/or for any other suitable duration.

In a first example, the control instructions can be the target power output (e.g., watt) for the cook cavity at a timestep.

In a second example, the control instructions can be the power output during a timestep for a heating element.

In a third example, the control instructions include a power output schedule for each heating element subset (e.g., PWM schedule), wherein each power output schedule defines the respective heating element subset's power output for each of a set of cycles (e.g., utility cycles, AC cycles, etc.). In this example, the control instructions can be determined on a per-timestep basis. For example, the control instructions can be determined based on the model output for the respective heating element (e.g., for the timestep), the temperature setpoint (e.g., for the timestep), and optionally the currently measured temperature, or be otherwise determined.

In a fourth example, the control instructions can include a power output schedule for all heating element subsets for a phase of the cooking session or the entirety of the cooking session.

However, the system can additionally or alternatively include and/or be used with any other suitable components and/or elements.

5. Method

The method for individual heating element control can include: identifying a food within a cook cavity S100, determining a set of cooking instructions associated with the food S200, determining control instructions for each heating element subset based on the set of cooking instructions S300, controlling each heating element subset based on the respective control instructions S400, and/or any other suitable elements.

All or portions of the method can be performed in real- or near-real time, or asynchronously with the cook session. All or portions of the method can be performed at the edge (e.g., by the appliance, by a user device connected to the appliance, etc.) and/or at a remote computing system.

The method can be performed after a predetermined event (e.g., door open, door close, door open and door close), after receiving user input (e.g., cook instruction), after receiving a user device instruction (e.g., based on the cook program associated with the scroll or dwell position within a recipe), periodically, and/or at any other suitable time.

5.1 Identifying a Food Within a Cook Cavity S100

Identifying a food within a cook cavity S100 can function to determine the food inserted into the cook cavity for determining a set of cooking instructions associated with the food S200.

The food can be: proteins (e.g., chicken, salmon, steak, etc.), vegetables (e.g., brussels sprouts, root vegetables, etc.), and/or any other suitable food. The food can be associated with a single type of food, multiple types of food, and/or any other suitable quantity of types of food. The food can be associated with a confidence score (e.g., value between 0-1, value between 0-100, etc.) and/or associated with any other information.

In a first variant, identifying the food within the cook cavity can include receiving a user input and/or user selection of the food identifier.

In a second variant, identifying the food within the cook cavity can include receiving one or more images, processing the images, and applying an image classifier from the classification module to the processed images. For example, S100 can include: sampling a set of images depicting food within the cook cavity (e.g., in response to a trigger event, such as a door open or close event); and identifying the food within the images using a trained neural network (e.g., by classifying the food as one of a predetermined set of food classes). The images preferably depict a top-down view of the cavity, but can additionally or alternatively depict a side view, a top side view, a top corner view, or any other view. Processing the images can include: translating, warping, compositing, cropping, scaling, rotating, and other affine transforms, nonrigid transforms, registering, rebalancing, and/or otherwise processing the images. Applying the image classifier from the classification module to the processed images can include using neural networks (e.g., CNN, DNN, region proposal networks, single shot multibox detector, YOLO, RefineDet, Retina-Net, deformable convolutional networks, etc.), cascade of neural networks, logistic regression, Naive Bayes, k-nearest neighbors, decision trees, support vector machines, random forests, gradient boosting, and/or any other suitable image classifier.

The food can be identified using any of the methods disclosed in: U.S. application Ser. No. 16/793,309 filed 18 Feb. 2020, U.S. application Ser. No. 16/380,894 filed 10 Apr. 2019, U.S. application Ser. No. 17/311,663 filed 18 Dec. 2020, U.S. application Ser. No. 17/345,125 filed 11 Jun. 2021, U.S. application Ser. No. 17/245,778 filed 30 Apr. 2021, U.S. application Ser. No. 17/201,953 filed 15 Mar. 2021, U.S. application Ser. No. 17/216,036 filed 29 Mar. 2021, U.S. application Ser. No. 17/365,880 filed 1 Jul. 2021, U.S. application Ser. No. 17/376,535 filed 15 Jul. 2021, and/or U.S. application Ser. No. 17/403,472 filed 16 Aug. 2021, each of which are incorporated herein in their entireties by this reference.

However, the food can be otherwise identified.

5.2 Determining a Set of Cooking Instructions Associated with the Food S200

Determining a set of cooking instructions associated with the food S200 can function to enable determining control instructions for each heating element subset S300.

The set of cooking instructions can include: a temperature setpoint (e.g., the target temperature of the center of the cavity), heating element indexes, a set of model identifiers, and/or any other suitable cooking instructions. The set of model identifiers can include: a single model identifier associated with a model set (e.g., of one or more models, a model for each of a set of heating element subsets, etc.), a different model identifier for each model within the model set, and/or any other suitable number of model identifiers. The model(s) identified by the model set identifiers can include: a model type, model parameters associated with the model types, and/or other variables. Model types can include: a sine curve, square curve, triangle curve, sawtooth curve, and/or any other suitable model types. The model parameters can include: a phase shift time (e.g., how long before the heating element is first turned on), a curve period (e.g., how long each on/off cycle or period lasts), a maximum output (e.g., the highest power output reached by the heating element during the cycle, for example expressed as a percentage of the heating element's maximum heat or power output), a minimum output (e.g., the lowest power output reached by the heating element during the cycle), a curve amplitude (e.g., maximum power output change over the cycle), deadtime (e.g., how long before the next cycle, after the heating element cycles back to the minimum output), an amplitude offset (e.g., how much the power output curve is offset), a power curve, and/or any other suitable model parameters.

In a first variant, the set of cooking instructions is received from a user.

In a second variant, determining the set of cooking instructions associated with the food can include retrieving the cooking instructions stored in a database based on the food identifier. For example, a first set of cooking instructions can be retrieved for chicken, and another set of cooking instructions can be retrieved for steak. The database can be hosted by a remote computing system, the appliance, and/or any other suitable computing system. In this variant, the cooking instructions can be predetermined (e.g., crowd-sourced, authored by a recipe author, learned, etc.), dynamically determined (e.g., based on the current food state and a target food state or expected food state), and/or otherwise determined.

In a third variant, determining the set of cooking instructions associated with the food can include deriving a model for each heating element. The model for each heating element can be derived de novo or from a shared base model.

However, the set of cooking instructions can be otherwise determined.

5.3 Determining Control Instructions for Each Heating Element Subset Based on the Set of Cooking Instructions S300

Determining control instructions for each heating element subset based on the set of cooking instructions S300 can function to enable control of each heating element subset S400.

The control instructions can be: specified by the set of cooking instructions, calculated, manually specified, automatically determined (e.g., learned based on historical cooking sessions), or otherwise determined. The control instructions can be: for a timestep, for multiple timesteps, for a cooking phase, for a cooking session, and/or for any other suitable time. The control instructions are preferably for the next timestep, but can additionally or alternatively be for a future timestep, the current timestep, and/or for any other suitable timestep. The control instructions are preferably determined during appliance operation (e.g., dynamically determined), but can alternatively be predetermined (e.g., before the cook session, etc.). The control instructions preferably include low-level control instructions (e.g., machine instructions, switch instructions, PWM instructions, AC schedules, etc.), but can alternatively include high-level control instructions (e.g., target temperatures, etc.). The control instructions preferably include a target operation state for each heating element (e.g., target power output for the heating element subset, etc.) for each evaluation time unit (e.g., AC cycle, timestep, etc.), but can alternatively include the power to provide to a heating element, and/or include any other suitable instruction.

In a first variant, S300 includes retrieving the control instructions from the cooking instructions, wherein the cooking instructions specify a temperature or power setpoint for each heating element subset (e.g., for each timestep, for each time window, for the cooking session, etc.) and/or for the heating element set.

In a second variant, S300 can include determining a target power output for each heating element subset for each timestep within a cooking session based on the cooking instructions. The timestep can be determined by the frequency of the processing system (e.g., milli-seconds, deci-seconds, seconds, minutes, etc.), or be otherwise defined.

In a first embodiment, determining a target power output for each heating element subset for each timestep includes retrieving a predetermined target power output for each heating element subset from the cooking instructions (e.g., wherein the cooking instructions include a target power output schedule for each heating element).

In a second embodiment, determining a target power output for each heating element subset for each timestep includes determining the target power output using the respective model (e.g., directly). In this embodiment, the heating element subset's target power output can be determined based on: the measured temperature, the temperature setpoint, the timestep, the food state (e.g., food temperature, food color, etc.), and/or any other suitable parameters. In this embodiment, the model can be a Hidden Markov model, a neural network (e.g., trained to determine the correct target power output to achieve the target temperature setpoint), and/or be any other suitable model.

Figure 6:
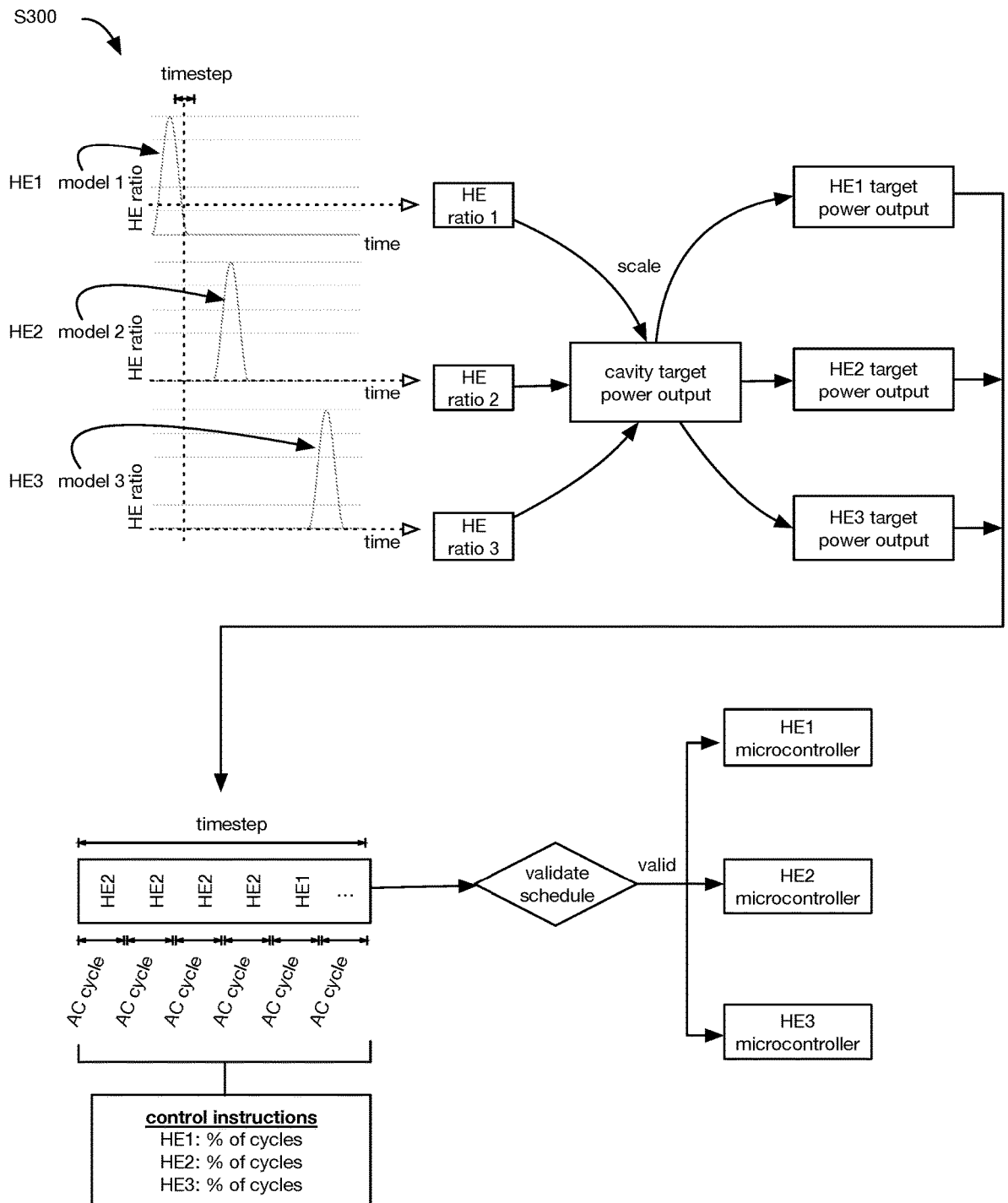
FIG. 6 depicts an example of the method.

In a third embodiment, determining a target power output for each heating element subset for each timestep within a cooking session can include: determining a heating element ratio for each heating element subset for the timestep; determining a target power output for the cook cavity; and determining a target power output for each heating element subset for the timestep based on the target power output for the cook cavity by the respective heating element ratio (example shown in FIG. 6).

Determining a heating element ratio for each heating element subset for the timestep can include determining the current timestep (e.g., the current time; as determined from the beginning of the cook session, cook session initialization event timestamp, etc.); and calculating the heating element ratio for the timestep based on the respective model and the current time (e.g., wall clock time, current cooking session time, etc.). However, the heating element ratio can be: a static ratio, retrieved from the cooking instructions (e.g., wherein the cooking instructions can define a timeseries of ratios for each heating element subset), be determined from the other heating element subset ratios (e.g., wherein the heating element subset's ratio is normalized based on the other heating element subset ratios), and/or otherwise determined.

Determining a target power output for the cook cavity functions to determine the overall power to collectively output into the cook cavity (e.g., to coordinate the individually-operated heating element subsets, such that they do not collectively overheat the cook cavity). The target power output can be in watts, be a PWM setting, and/or have any other suitable format.

In a first example, the target power output for the cook cavity can be determined based on the temperature setpoint, a measured temperature, a temperature compensation factor (e.g., to compensate for a temperature difference between the cavity center and a temperature sensor location), and/or another parameter. The temperature setpoint retrieved from the cooking instructions and the measured temperature measured by a sensor (e.g., temperature sensor, probe thermometer, etc.). The target power output can be the amount of power output required to: raise the cavity temperature to the temperature setpoint; maintain the cavity temperature (e.g., when the measured temperature substantially matches the temperature setpoint, such as within several degrees or within a predetermined error range); decrease the cavity temperature to the temperature setpoint; and/or achieve any other suitable goal. The target power output can be calculated, determined from a lookup table, determined using closed-loop feedback, and/or otherwise determined.

In a second example, the target power output for the cook cavity can be retrieved from the cook instructions, wherein the cook instructions can specify a power output schedule for the cook cavity.

However, the target power output for the cavity can be otherwise determined.

Figure 10:
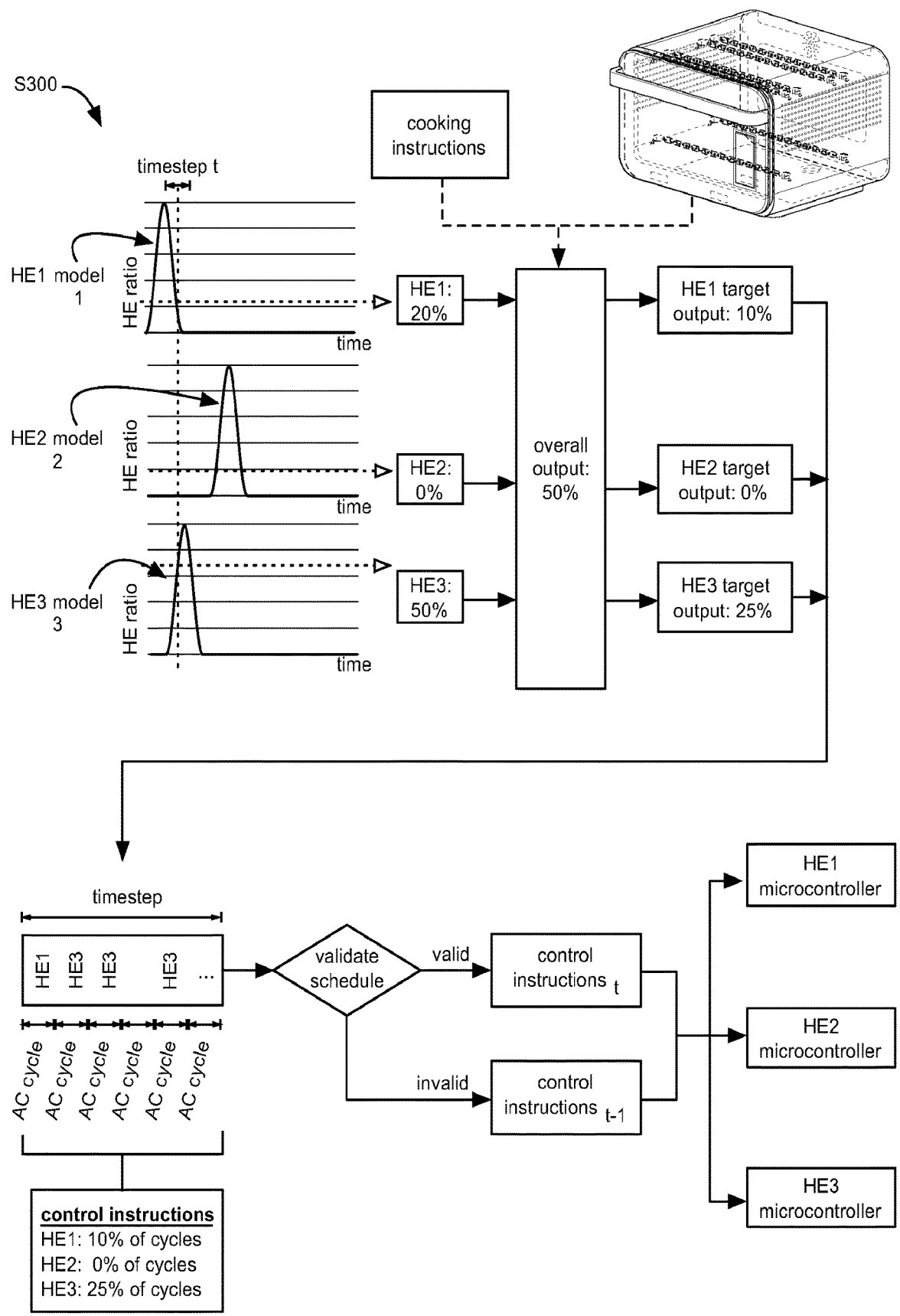
FIG. 10 is a first illustrative example of appliance control.

Determining a target power output for each heating element subset for the timestep functions to determine the power setting for each heating element subset for the given timestep. The target power output for each heating element subset is preferably determined based on the respective heating element ratio and the target power output for the cavity, but can additionally or alternatively be determined based on any other suitable parameter. The target power output for each heating element subset can be determined by scaling, adding, dividing, and/or any otherwise adjusting of the target power output for the cook cavity by the respective heating element ratio. In a specific example, determining a target power output for each heating element subset for the timestep is scaling the target power output for the cook cavity by the respective heating element ratio. For example, when the heating element ratio is 90% and the target power output for the cavity is 10%, the heating element subset's target power output can be 9%. In another example, when the heating element ratio is 50% and the target power output for the cavity is 50%, the heating element subset's target power output can be 25%; example shown in FIG. 10.

However, the target power output for each heating element can be otherwise determined.

S300 can additionally or alternatively include scheduling the heating element subsets to AC cycles of each timestep. The heating element subsets are preferably scheduled based on the respective target power outputs, and can optionally be scheduled based on a measured power output for each heating element subset, the prior-scheduled power outputs for the heating element subset for the timestep, the scheduled power outputs for the remainder of the heating element subsets, a correction factor for each heating element subset (e.g., a calibration factor, etc.), on-off cycle distribution within the timestep (e.g., wherein the on and/or off assignments for a heating element subset are evenly distributed throughout the cycle or are clustered together within the cycle), and/or based on any other suitable parameter. For example, when the target power output for a heating element subset is 50%, the heating element subset can be scheduled to 50% of the AC cycles, be on or operated at high power for 50% of the cycles, or be otherwise operated. Each timestep preferably includes a plurality of alternating current (AC) cycles (e.g., 100 cycles, 200 cycles, 300 cycles, any range defined therebetween, less than 100 cycles, more than 300 cycles, etc.), but can alternatively include a single AC cycle. In another example, when the target power output for a heating element subset is 60%, the heating element subset can be scheduled to 60% of the AC cycles during the timestep with an even distribution of AC cycles (e.g., 100 cycles in the timestep, 60 cycles on consecutively, 40 cycles off consecutively) to prevent arc fault breakers trips and noticeable visual flicker of the heating element subset.

One or more heating elements can be scheduled for each AC cycle. For example, a single heating element subset can be scheduled to each AC cycle (e.g., wherein one heating element subset is on or set to high power, and the others are off or set to low power). In another example, each heating element subset can have a power output value (e.g., PWM value) for each AC cycle.

In a first example, scheduling the heating element subsets to AC cycles can include preferentially scheduling the heating element subset with a greatest difference between the respective target power output and a respective aggregate scheduled power output for the timestep. In a specific example, this can include, for each AC cycle: determining an aggregate scheduled power output for the timestep for each heating element subset (e.g., by adding up the power outputs for prior AC cycles for the heating element subset); determining the target power output for the heating element subset; determining a difference between the respective target power output and the respective aggregate scheduled power output; and scheduling the heating element subset with the largest difference to the AC cycle, wherein the scheduling method is repeated until all AC cycles have been scheduled.

In a second example, scheduling the heating element subsets to AC cycles can include scheduling each heating element subset randomly.

In a third example, scheduling the heating element subsets to AC cycles can include scheduling each heating element subset by heating element index. For example, the first heating element subset can be scheduled to AC cycles until the first heating element subset's target power output is met, then the second heating element subset is scheduled to the next set of AC cycles until the second heating element subset's target power output is met, and the process is repeated until all heating element subsets are scheduled and/or all AC cycles have been scheduled.

In a fourth example, scheduling the heating element subsets is similar to the third example, except that the heating element subsets are scheduled in priority order, wherein priority can be determined based on a difference between the target power output and the current power output (e.g., wherein heating element subsets with larger differences have higher priority).

In a fifth example, scheduling the heating element subsets to AC cycles can include setting the power output for each AC cycle to the target power output for each AC cycle. For example, when the target power output for a heating element subset is 50%, the heating element subset is scheduled to operate at 50% output for each AC cycle.

In a sixth example, scheduling the heating element subsets to AC cycles can include scheduling each heating element subset based on optimizing the current power output and the target power output.

In a seventh example, heating element subsets are scheduled to an AC cycle until one or more conditions are met. Examples of the conditions can include: all heating element subsets have been scheduled, the total power output for each heating element subset for the timestep has been satisfied, the total scheduled power output for the AC cycle satisfies a threshold (or will exceed the threshold if another heating element subset is scheduled to the AC cycle), and/or any other suitable condition.

In an eighth example, heating element subsets are scheduled to the next AC cycle when the difference between the target power output for the heating element subset and an aggregate scheduled power output over the timestep for the heating element subset exceeds a threshold. The threshold can be: the next-highest difference between the target and aggregate scheduled power output for another heating element subset, a predetermined threshold, and/or any other suitable threshold.

However, the heating element subsets can be otherwise scheduled to AC cycles within the timestep.

However, other control instructions can be generated for each heating element subset based on the respective target power output.

S300 can optionally include validating the control instructions, which functions to identify invalid or dangerous control instructions (e.g., control instructions that will blow a fuse, that exceed an appliance power output threshold, etc.).

Figure 11:
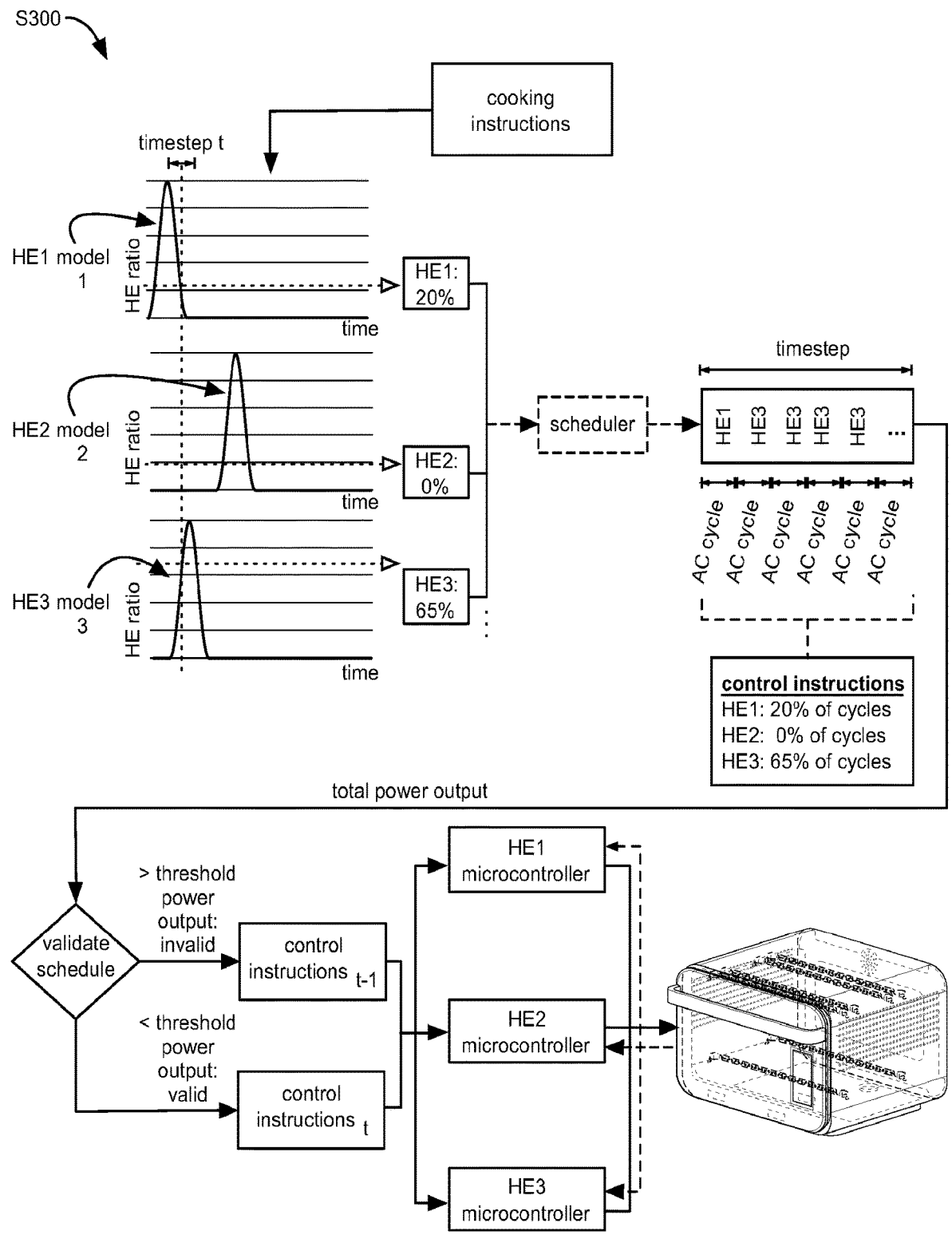
FIG. 11 is a second illustrative example of appliance control.

Validating the control instructions can include: determining a total power output for the timestep based on the control instructions across the set of heating elements for the timestep, accepting the control instructions when the total power output is less than or equal to a threshold power output (e.g., power threshold; threshold output; etc.), and rejecting the control instructions when the total power output is greater than a threshold power output; example shown in FIG. 11.

The total power output for the timestep can be determined: on a cycle-by-cycle basis (e.g., wherein the aggregate power for each AC cycle cannot exceed the power threshold), on a timestep basis (e.g., wherein the aggregate power output for all heating element subsets across all AC cycles cannot exceed the power threshold), and/or for any other suitable evaluation time unit. The total power output is preferably determined by summing the scheduled power outputs for each heating element subset over the evaluation time unit, but can be otherwise determined.

Accepting the control instructions preferably includes storing the control instructions for use in a subsequent timestep (e.g., the next timestep, a future timestep, etc.), but can alternately include immediately controlling the respective heating element subsets according to the accepted control instructions, or otherwise managing the control instructions.

Rejecting the control instructions can include not storing the control instructions, not using the control instructions in a subsequent timestep, and/or otherwise managing the control instructions.

When the control instructions are rejected, the method can additionally include: retrieving a prior set of control instructions (e.g., from the last timestep, from a past timestep, etc.) for use in the subsequent timestep (e.g., next timestep), adjusting the control instructions, and/or otherwise determining a set of valid control instructions for use. For example, the scheduled power outputs across the heating element set can be normalized by the power threshold to adjust the control instructions, such that the heating elements collectively satisfy the power threshold. However, valid control instructions can be otherwise determined.

S300 can optionally include determining the control instructions of cooking element subsets based on the heating element subset schedules and/or applying the method to determine schedules for the cooking element subsets (e.g., in lieu of or in addition to heating element subset scheduling). In variants, this can function to operate the cooking element subset and the heating element subsets in unison. The cooking element subsets can include convection element subsets (e.g., convection fan subsets), steaming element subsets (e.g., valve and/or reservoir subsets), and/or any other suitable cooking element subset.

In a first example, this can include determining the control instructions of convection fan subsets based on the heating element subset operation state. For example, the control instructions of the convection fan subsets can include increasing the power of the convection fan subsets proportionally to the respective heating element subsets that are assigned on. In another example, the operation of the cooking elements (e.g., convection fans) can follow a curve, such that they ramp up when certain heating elements are on and/or as a function of the heating element power output.

In a second example, this can include determining the control instructions of the steaming element subsets based on when the heating element subsets are assigned off. For example, the control instructions of the steaming element subsets can include injecting steam into the cook cavity when all the heating element subsets are off.

However, the control instructions can be otherwise determined.

5.4 Controlling Each Heating Element Subset Based on the Respective Control Instructions S400

Controlling each heating element subset based on the respective control instructions S400 can function to individually control each heating element subset. Each heating element subset is preferably controlled to output the respective target power output (e.g., for the timestep), but can be otherwise controlled. S400 can be performed by the primary processing system (e.g., primary microcontroller), the secondary processing system (e.g., secondary microcontroller), and/or by any other suitable processing system.

In a first variant, each heating element subset is controlled according to the respective control schedule determined in S300.

In a second variant, each heating element is initially controlled according to the respective control schedule determined in S300, and a secondary control loop can adjust the control schedule such that the cavity parameter substantially matches the parameter setpoint. For example, the system can continuously sample a cavity measurement (e.g., temperature), and iteratively adjust the control schedule based on the cavity measurement and a target cavity parameter value (e.g., temperature setpoint). Adjusting the control schedule can include: scaling the power output per heating element subset per remaining AC cycle; selectively unscheduling heating element subsets from, or scheduling heating element subsets to, AC cycles (e.g., randomly, based on the heating element subset's physical location and the errant cavity subregion, etc.); and/or otherwise adjusting the control schedule.

However, each heating element subset can be otherwise controlled.

Alternative embodiments implement the above methods and/or processing modules in non-transitory computer-readable media, storing computer-readable instructions, that, when executed by a processing system, cause the processing system to perform the method(s) discussed herein. The instructions can be executed by computer-executable components integrated with the computer-readable medium and/or processing system. The computer-readable medium may include any suitable computer readable media such as RAMs, ROMs, flash memory, EEPROMs, optical devices (CD or DVD), hard drives, floppy drives, non-transitory computer readable media, or any suitable device. The computer-executable component can include a computing system and/or processing system (e.g., including one or more collocated or distributed, remote or local processors) connected to the non-transitory computer-readable medium, such as CPUs, GPUs, TPUS, microprocessors, or ASICs, but the instructions can alternatively or additionally be executed by any suitable dedicated hardware device.

Embodiments of the system and/or method can include every combination and permutation of the various system components and the various method processes, wherein one or more instances of the method and/or processes described herein can be performed asynchronously (e.g., sequentially), contemporaneously (e.g., concurrently, in parallel, etc.), or in any other suitable order by and/or using one or more instances of the systems, elements, and/or entities described herein. Components and/or processes of the following system and/or method can be used with, in addition to, in lieu of, or otherwise integrated with all or a portion of the systems and/or methods disclosed in the applications mentioned above, each of which are incorporated in their entirety by this reference.

As a person skilled in the art will recognize from the previous detailed description and from the figures and claims, modifications and changes can be made to the preferred embodiments of the invention without departing from the scope of this invention defined in the following claims.

We claim:

1. A method for operating a cooking appliance comprising a set of heating elements, the method comprising:
   identifying, based on one or more measurements obtained from one or more sensors, food within a cook cavity of the cooking appliance;
   determining, based on identification of the food and based on a state of the food, a set of cooking instructions associated with the food, wherein each cooking instruction, in the set of cooking instructions, comprises a timestep and a temperature setpoint associated with a cooking methodology;
   dynamically determining, based on the set of cooking instructions, control instructions for each heating element of the set of heating elements;
   controlling, based on a first timestamp and based on a first temperature set point associated with a first cooking methodology, each heating element to cook the food in accordance with the first cooking methodology; and
   controlling, based on a second timestamp and based on a second temperature set point associated with a second cooking methodology that is different from the first cooking methodology, each heating element to cook the food in accordance with the second cooking methodology.

2. The method of claim 1, wherein the cooking appliance comprises at least one of:
   an oven;
   a grill; or
   a smoker.

3. The method of claim 1, wherein the set of heating elements comprises at least one of metal heating elements, ceramic heating elements, semiconductor heating elements, thick film heating elements, polymer PTC heating elements, or composite heating elements.

4. The method of claim 1, wherein:
   each cooking instruction, in the set of cooking instructions, comprises a different model for each heating element; and
   each model comprises values for each parameter of a model parameter set, the model parameter set comprising a curve type, curve period, and curve amplitude.

5. The method of claim 1, wherein dynamically determining control instructions for each heating element comprises determining a target power output for each heating element for each timestep within a cooking session.

6. The method of claim 5, wherein determining the target power output for each heating element for each timestep within the cooking session comprises, for each timestep:
   determining a heating element ratio for each heating element for the timestep;
   determining a target power output for the cook cavity based on the temperature setpoint and a measured temperature; and
   determining the target power output for each heating element for the timestep by scaling the target power output for the cook cavity by the respective heating element ratio.

7. The method of claim 5, wherein each timestep encompasses a plurality of alternating current (AC) cycles, wherein determining control instructions for each heating element further comprises scheduling each of the heating elements to AC cycles of each timestep based on the target power output and a measured power output for the respective heating element.

8. The method of claim 7, wherein scheduling each of the heating elements to AC cycles comprises, for each successive AC cycle, preferentially scheduling the heating element with a greatest difference between the respective target power output and a respective aggregate scheduled power output for the timestep.

9. The method of claim 1, wherein dynamically determining the control instructions for each heating element further comprises:
   determining a total power output for a timestep based on the control instructions across the set of heating elements for the timestep; and
   accepting the control instructions when the total power output is less than or equal to a threshold power output.

10. A cooking appliance comprising:
    a housing defining a cook cavity configured to receive food;
    a set of heating elements thermally connected to the cook cavity;
    one or more sensors;
    a processing system, configured to:
      determine, based on one or more measurements obtained using the one or more sensors, a food identifier for the food;
      determine, based on the one or more measurements, a current state of the food;
      determine, based on the food identifier and based on the current state of the food, a set of cooking instructions associated with the food, wherein each cooking instruction, in the set of cooking instructions, comprises a timestep and a temperature setpoint associated with a cooking methodology;
      determine, based on the set of cooking instructions, control instructions for each heating element of the set of heating elements;
      control, based on a first timestamp and based on a first temperature set point associated with a first cooking methodology, each heating element to cook the food in accordance with the first cooking methodology; and
      control, based on a second timestamp and based on a second temperature set point associated with a second cooking methodology that is different from the first cooking methodology, each heating element to cook the food in accordance with the second cooking methodology.

11. The cooking appliance of claim 10, wherein the cooking appliance comprises at least one of:
    an oven;
    a grill; or
    a smoker.

12. The cooking appliance of claim 10, wherein:
    each cooking instruction, in the set of cooking instructions, comprises a different model for each heating element; and the model comprises a model parameter set, the model parameter set comprises a curve type, curve period, and curve amplitude.

13. The cooking appliance of claim 12, wherein values for each model parameter within the model parameter set are learned.

14. The cooking appliance of claim 10, wherein determining control instructions for each heating element comprises determining a power output for each heating element for each timestep within a cooking session.

15. The cooking appliance of claim 14, wherein determining the power output for each heating element comprises, for each timestep:
   determining a heating element ratio for each heating element for the timestep;
   determining a target power output for the cook cavity based on the temperature setpoint and a measured temperature; and
   determining the target power output for each heating element for the timestep by scaling the target power output for the cook cavity by the respective heating element ratio.

16. The cooking appliance of claim 10, wherein:
   a cooking session comprises a plurality of timesteps, each timestep encompasses a plurality of alternating current (AC) cycles;
   the control instructions comprise a target operation state for each heating element for each alternating current (AC) cycle of the timestep; and
   the target operation state for a heating element is determined based on a target power output and a measured power output for the respective heating element.

17. The cooking appliance of claim 16, wherein determining control instructions comprise, for each successive AC cycle:
   for each heating element:
      determining a difference between the target power output and an aggregate scheduled power output over the timestep for the heating element; and
      setting target operation state to high power for the AC cycle when the difference exceeds a threshold.

18. The method of claim 1, wherein the one or more sensors comprises at least one of:
   a CCD camera;
   a CMOS camera;
   a wide-angle camera;
   an infrared camera;
   a stereo camera; or
   a video camera.

19. The method of claim 1, wherein the one or more measurements comprises a set of images of the food within the cook cavity.

20. The method of claim 1, wherein the one or more sensors are located in a cook cavity of the cooking appliance.

21. The method of claim 1, wherein the set of heating elements comprises:
   at least one gas heating element; and
   at least one infrared heating element.

22. The cooking appliance of claim 16, wherein the set of heating elements comprises:
   at least one gas heating element; and
   at least one infrared heating element.

* * * * *